(12) United States Patent     (10) Patent No.:   US 12,663,888 B2

Ha et al.     (45) Date of Patent:   Jun. 23, 2026

(54) DISPLAY DEVICE HAVING FOLDING AREA

(71) Applicant: Samsung Display Co., LTD., Yongin-si (KR)

(72) Inventors: Seung Hwa Ha, Cheongju-si (KR); Do Youb Kim, Suwon-si (KR); Seung-Ho Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 157 days.

(21) Appl. No.: 18/105,731

(22) Filed: Feb. 3, 2023

(65) Prior Publication Data

US 2023/0251729 A1     Aug. 10, 2023

(30) Foreign Application Priority Data

Feb. 9, 2022    (KR) ........................ 10-2022-0017184

(51) Int. Cl.
    *G06F 1/16*       (2006.01)
    *G06F 3/041*      (2006.01)

(52) U.S. Cl.
    CPC ............ *G06F 3/041* (2013.01); *G06F 1/1652* (2013.01); *G06F 1/1641* (2013.01)

(58) Field of Classification Search
    CPC ...... G06F 3/041; G06F 1/1652; G06F 1/1641; G06F 1/1637; Y02E 10/549; G09F 9/301
    See application file for complete search history.

(56) References Cited

U.S. PATENT DOCUMENTS

| | | | | |
|---|---|---|---|---|
| 10,164,208 B2 * | 12/2018 | Lee | ......................... | B32B 3/266 |
| 10,798,831 B2 * | 10/2020 | Shin | ..................... | H05K 5/0217 |
| 11,246,228 B2 * | 2/2022 | Kim | ...................... | G06F 1/1641 |
| 11,546,986 B2 * | 1/2023 | Wang | ..................... | H05K 1/028 |
| 11,551,586 B2 * | 1/2023 | Ha | ........................ | H04M 1/0214 |
| 11,662,771 B2 * | 5/2023 | Kim | ...................... | G06F 1/1652 |
| | | | | 361/679.01 |
| 11,662,780 B2 * | 5/2023 | Park | ...................... | G06F 1/1681 |
| | | | | 361/679.01 |
| 11,775,013 B2 * | 10/2023 | Cho | ....................... | G06F 1/1681 |
| | | | | 361/679.01 |
| 11,793,061 B2 * | 10/2023 | Cai | .......................... | B32B 3/14 |
| | | | | 361/807 |
| 11,979,997 B2 * | 5/2024 | Kwak | ................... | G06F 1/1641 |
| 12,011,907 B2 * | 6/2024 | Park | ........................ | G09F 9/301 |
| 12,130,669 B2 * | 10/2024 | Wang | ...................... | G02F 1/133 |
| 12,133,341 B2 * | 10/2024 | Wang | ....................... | G09F 9/30 |
| 2015/0055287 A1 * | 2/2015 | Seo | ...................... | G06F 1/1652 |
| | | | | 361/679.27 |
| 2016/0357052 A1 * | 12/2016 | Kim | ...................... | H10K 59/87 |

(Continued)

FOREIGN PATENT DOCUMENTS

| | | |
|---|---|---|
| KR | 10-2016-0080034 A | 7/2016 |
| KR | 10-2019-0124844 A | 11/2019 |

(Continued)

*Primary Examiner* — Rockshana D Chowdhury

(74) *Attorney, Agent, or Firm* — Womble Bond Dickinson (US) LLP

(57) ABSTRACT

A display device includes: a display module; a plate on one surface of the display module; and an adhesive layer between the display module and the plate, wherein the plate includes a folding area and a folding peripheral area, the folding area of the plate includes a plurality of grooves, and the adhesive layer overlaps a portion of the folding area.

16 Claims, 20 Drawing Sheets

(56)     References Cited

U.S. PATENT DOCUMENTS

| | | | | |
|---|---|---|---|---|
| 2020/0259115 A1* | 8/2020 | Shin | .................... | H10K 50/844 |
| 2020/0411777 A1* | 12/2020 | Seo | .................... | H10K 77/111 |
| 2021/0007229 A1* | 1/2021 | Gu | .................... | G06F 1/1652 |
| 2021/0068272 A1* | 3/2021 | Horiuchi | .................... | G06F 1/1616 |
| 2021/0072790 A1* | 3/2021 | Myeong | .................... | G06F 1/1681 |
| 2021/0174711 A1* | 6/2021 | Cho | .................... | G09F 9/301 |
| 2021/0200381 A1* | 7/2021 | Kang | .................... | B32B 27/281 |
| 2022/0201879 A1* | 6/2022 | Kwak | .................... | H05K 5/0217 |
| 2023/0080858 A1* | 3/2023 | Lee | .................... | G06F 1/1641 |
| | | | | 361/807 |

FOREIGN PATENT DOCUMENTS

| | | |
|---|---|---|
| KR | 10-2020-0019000 A | 2/2020 |
| KR | 10-2020-0049925 A | 5/2020 |

* cited by examiner

DM

PL

100

PT

200

NFA    FA    NFA

DR3

DR1    DR2

In Folding Crease

In Folding Crease

DISPLAY DEVICE HAVING FOLDING AREA

CROSS-REFERENCE TO RELATED APPLICATION

The present application claims priority to and the benefit of Korean Patent Application No. 10-2022-0017184 filed in the Korean Intellectual Property Office on Feb. 9, 2022, the entire content of which is hereby incorporated by reference.

BACKGROUND

1. Field

Aspects of some embodiments of the present disclosure relate to a display device.

2. Description of the Related Art

As information technology has developed, the importance of display devices, which provide a connection medium between a user and information, has been highlighted.

Recently, research and development of foldable display devices, bendable display devices, rollable display devices, and the like capable of using advantages of a flexible display panel that may be bent or folded is being conducted. Such display devices may be applied to various fields, such as a television and a monitor, as well as a portable electronic device and a wearable device.

Recently, portable electronic devices such as smart phones and tablet PCs are becoming relatively lighter and thinner for portability, and they are developing in many ways for ease of use. For example, foldable electronic devices having a flexible display may enable a relatively larger screen than a bar type of electronic device, and when the electronic devices are folded, their size may be reduced, making it convenient to be portable, so that such electronic devices are being highlighted to satisfy consumer preferences.

The above information disclosed in this Background section is only for enhancement of understanding of the background and therefore the information discussed in this Background section does not necessarily constitute prior art.

SUMMARY

Aspects of some embodiments of the present disclosure relate to a display device, and for example, to a foldable display device.

Aspects of some embodiments include a foldable display device that may prevent or reduce lifting of an adhesive layer and may prevent or reduce deformation of a display module during folding.

According to some embodiments of the present disclosure, a display device includes: a display module; a plate positioned on one surface of the display module; and an adhesive layer positioned between the display module and the plate, wherein the plate includes a folding area and a folding peripheral area, the folding area of the plate includes a plurality of grooves, and the adhesive layer is positioned to overlap a portion of the folding area.

According to some embodiments, the plurality of grooves may be positioned along a first direction, and the display device may be folded in a second direction perpendicular to the first direction.

According to some embodiments, the adhesive layer may include areas spaced apart from each other in the second direction, and the areas spaced apart from each other may overlap the folding area.

According to some embodiments, a length in the second direction of the adhesive layer including the areas spaced apart from each other may be shorter than a length in the second direction of an area where the groove is formed.

According to some embodiments, a ratio of a length in the second direction of the folding area overlapping the adhesive layer to a length in the second direction of the folding area may be 30% to 60%.

According to some embodiments, the plate may further include a groove positioned in the non-folding area.

According to some embodiments, a portion of the folding area may not overlap the adhesive layer.

According to some embodiments, the display device may further include a protective member positioned between the display module and the adhesive layer.

According to some embodiments, the plurality of grooves may be positioned to be spaced apart from each other in the first direction and the second direction.

According to some embodiments, the display device may further include a digitizer positioned on the other surface of the plate.

Aspects of some embodiments of the present disclosure include a display device including: a display module; a plate positioned on one surface of the display module; and an adhesive layer positioned between the display module and the plate, wherein the plate includes a folding area and a folding peripheral area, the folding area of the plate includes a plurality of grooves, the adhesive layer is positioned to overlap the folding area, and the adhesive layer includes a plurality of grooves overlapping the folding area.

According to some embodiments, the plurality of grooves of the plate may be positioned along a first direction, and the display device may be folded in a second direction perpendicular to the first direction.

According to some embodiments, the groove of the adhesive layer may be positioned to overlap the groove of the plate.

According to some embodiments, the groove of the adhesive layer may include an area that does not overlap the groove of the plate.

According to some embodiments, the plurality of grooves of the adhesive layer may be positioned along a first direction, and the display device may be folded in a second direction perpendicular to the first direction.

According to some embodiments, the plurality of grooves of the plate may be positioned to be spaced apart from each other in the first direction and the second direction.

According to some embodiments, the plurality of grooves of the adhesive layer may be positioned to be spaced apart from each other in the first direction and the second direction.

According to some embodiments, the display device may further include a protective member positioned between the display module and the adhesive layer.

According to some embodiments, the display device may further include a digitizer positioned on the other surface of the plate.

According to some embodiments, the plate may further include a groove positioned in the non-folding area.

According to the embodiments of the present disclosure, it may be possible to provide a foldable display device that may prevent or reduce lifting of an adhesive layer and may prevent or reduce deformation of a display module during folding.

DETAILED DESCRIPTION

Figure 1:
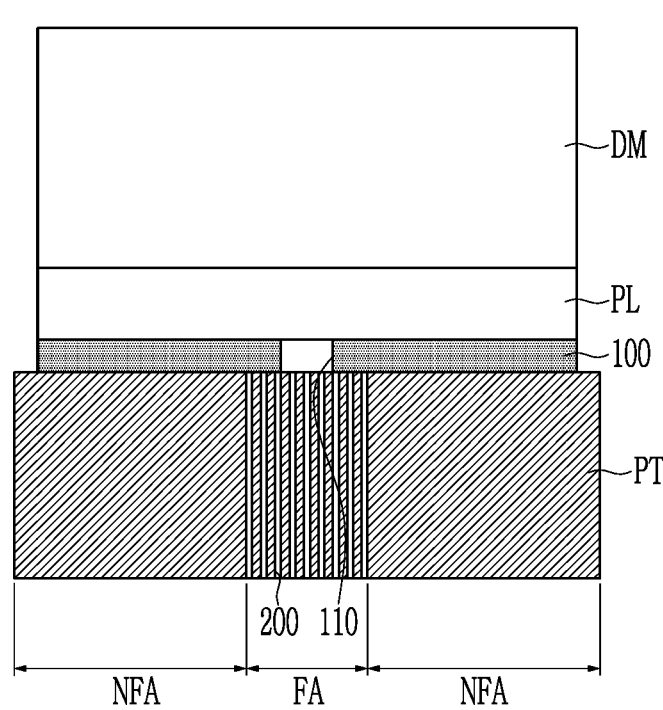
FIG. 1 illustrates a schematic cross-section of a display device according to some embodiments.
Figure 1:
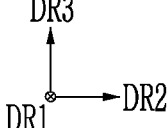

Aspects of some embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to more clearly describe the present invention, parts or portions that are irrelevant to the description are omitted, and identical or similar constituent elements throughout the specification are denoted by the same reference numerals.

Further, in the drawings, the size and thickness of each element are arbitrarily illustrated for ease of description, and embodiments according to the present disclosure are not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

FIG. 1 illustrates a schematic cross-section of a display device according to some embodiments. Referring to FIG. 1, the display device according to some embodiments may be a foldable display device. FIG. 1 illustrates a folding area FA in which folding is performed and a folding peripheral area NFA.

A display module DM may display an image. The display module DM may include a transistor and a light emitting element connected thereto, or a liquid crystal layer positioned between two substrates. In some embodiments, the display module DM may further include a color converting layer, a polarizing layer, a touch sensing layer, and the like.

A protective member PL may be positioned on one surface of the display module DM. The protective member PL may be located under the display module DM to support the display module DM and to protect the display module DM from an external impact. The protective member PL may be made of a polymer resin. For example, the protective member PL may include a polymer resin such as polyethersulfone, polyacrylate, polyether imide, polyethylene naphthalate, polyethylene terephthalate, polyphenylene sulfide, polyarylate, polyimide, polycarbonate, or cellulose acetate propionate.

A plate PT may be positioned under the protective member PL. The plate PT may include the folding area FA, and a plurality of grooves 200 may be formed in the folding area FA. The plate PT may be made of a metal or a reinforced plastic. For example, the plate PT may be carbon fiber reinforced plastic. In addition, the plate PT may be multi-layered, and carbon fiber reinforced plastic and glass fiber reinforced plastic may be alternately stacked.

The plate PT may be positioned under the display module DM to support the display module DM. In addition, the plate PT may be positioned at an upper portion of a digitizer to protect the digitizer from an external impact.

The plate PT may include a plurality of grooves 200. Due to the groove 200, the plate PT may be folded based on a folding axis. According to some embodiments, the plate PT excluding the groove 200 may have a planar upper surface. A further details of the shape of the groove 200 will be described in more detail later.

In FIG. 1, the groove 200 may be formed along a first direction DR1. The display device may be folded in a second direction DR2 perpendicular to the first direction DR1. The display device may be stacked in a third direction DR3 perpendicular to both the first direction DR1 and the second direction DR2.

The plate PT and the protective member PL are bonded to each other through an adhesive layer 100. In this case, referring to FIG. 1, the adhesive layer 100 may be positioned to partially overlap the groove 200 of the plate PT. That is, the adhesive layer 100 may be positioned in both the folding area FA and the folding peripheral area NFA. As shown in FIG. 1, a portion of the groove 200 is positioned to overlap the adhesive layer 100, and due to this structure, deformation and lifting of the adhesive layer 100 may be alleviated during folding. Further characteristics according to some embodiments will be separately described later in more detail.

Figure 2:
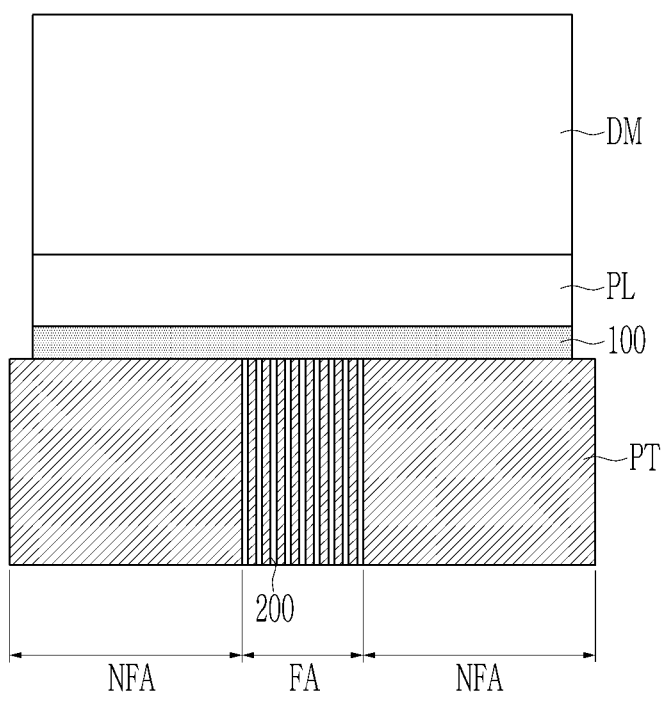
FIG. 2 illustrates a cross-section of a display device according to some embodiments corresponding to the cross-section of FIG. 1.
Figure 2:
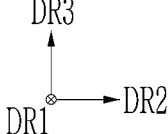

FIG. 2 illustrates a cross-section of a display device according to some embodiments corresponding to the cross-section of FIG. 1. Referring to FIG. 2, in the display device according to some embodiments, the adhesive layer 100 overlaps the entire plate PT. That is, the adhesive layer 100 is positioned in both the folding area FA and the folding peripheral area NFA, and all of the groove 200 of the plate PT overlaps the adhesive layer 100. In the embodiments shown with respect to FIG. 2, according to some embodiments, a plurality of openings corresponding to the groove 200 may be formed in the adhesive layer positioned in the folding area FA. This will be described in more detail later with reference to FIG. 8. Even in the embodiments described with respect to FIG. 2, the groove 200 is positioned to overlap the adhesive layer 100, thereby reducing deformation and lifting of the adhesive layer 100 during folding. Further characteristics according to some embodiments will be separately described later in more detail.

Figure 3:
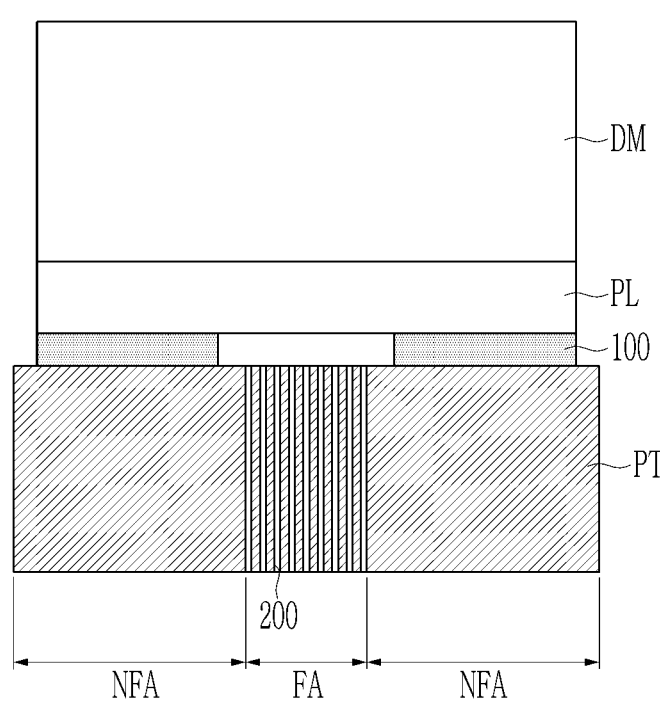
FIG. 3 illustrates a cross-section of a display device in which a groove does not overlap an adhesive layer according to some embodiments.
Figure 3:
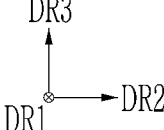

FIG. 3 illustrates a cross-section of a display device in which the groove 200 does not overlap the adhesive layer 100. In this structure, the adhesive layer 100 near the folding area FA may be lifted or deformed during folding.

Figure 4:
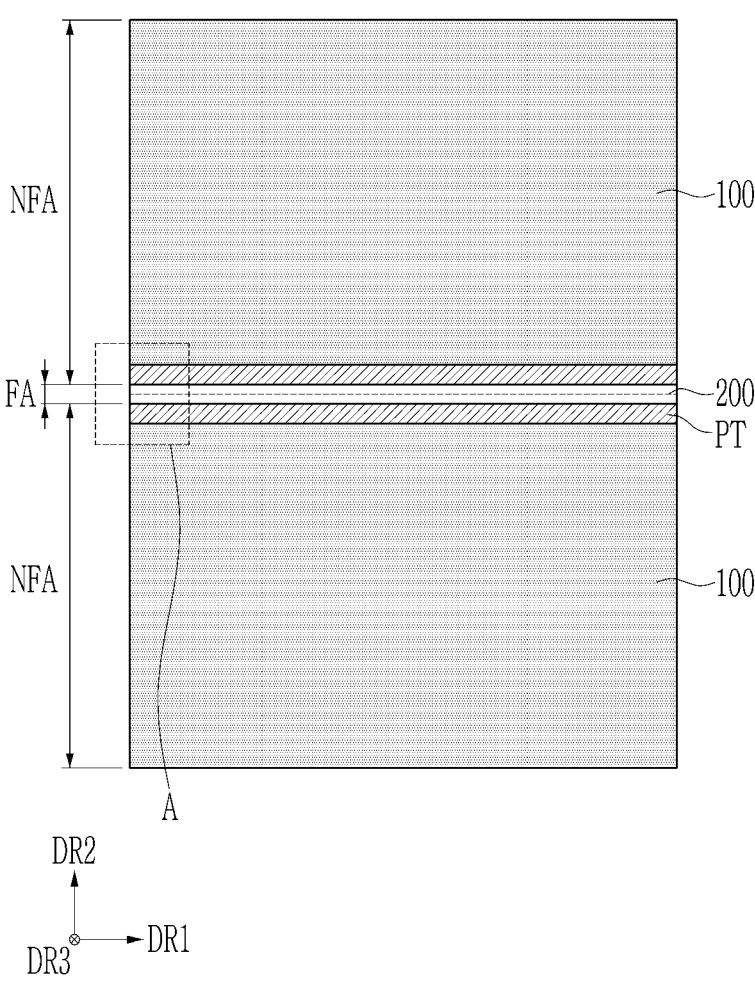
FIG. 4 illustrates a top plan view of an adhesive layer and a plate of FIG. 3 according to some embodiments.

FIG. 4 illustrates a top plan view of the adhesive layer 100 and the plate PT of FIG. 3. Referring to FIG. 4, the plate PT includes a plurality of grooves 200 positioned in the folding area FA. The adhesive layers 100 are spaced apart from each other with the folding area FA therebetween. The adhesive layer 100 does not overlap the groove 200.

Figure 5:
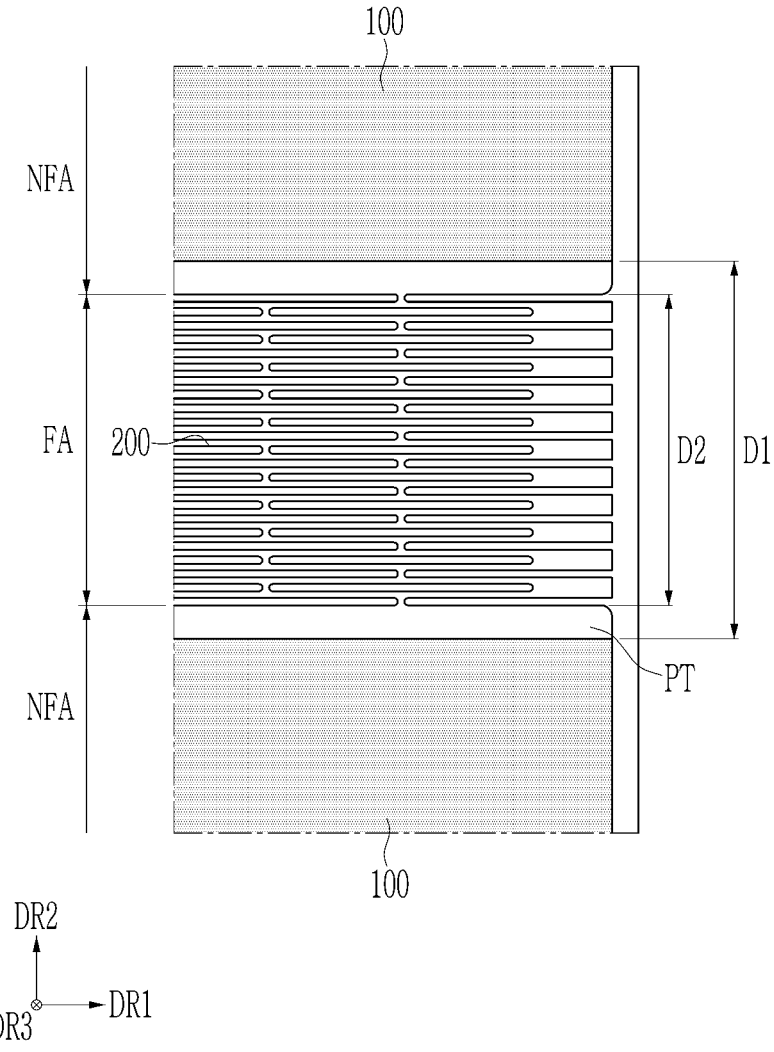
FIG. 5 illustrates an enlarged view of area "A" of FIG. 4 according to some embodiments.

FIG. 5 illustrates an enlarged view of area "A" of FIG. 4. Referring to FIG. 5, a plurality of grooves 200 are positioned along the first direction DR1. The plurality of grooves 200 are spaced apart from adjacent grooves 200 in the first direction DR1 and the second direction DR2. The display device may be bent in the second direction DR2.

Referring to FIG. 5, according to some embodiments, a separation distance D1 of the adhesive layer 100 in the second direction DR2 is longer than a length D2 of an area in which the groove 200 is formed in the second direction DR2. Accordingly, the adhesive layer 100 and the groove 200 do not overlap. In this case, although it will be described separately later, a problem that an edge of the adhesive layer 100 is lifted or deformed may occur during folding and unfolding of the display device.

Figure 6:
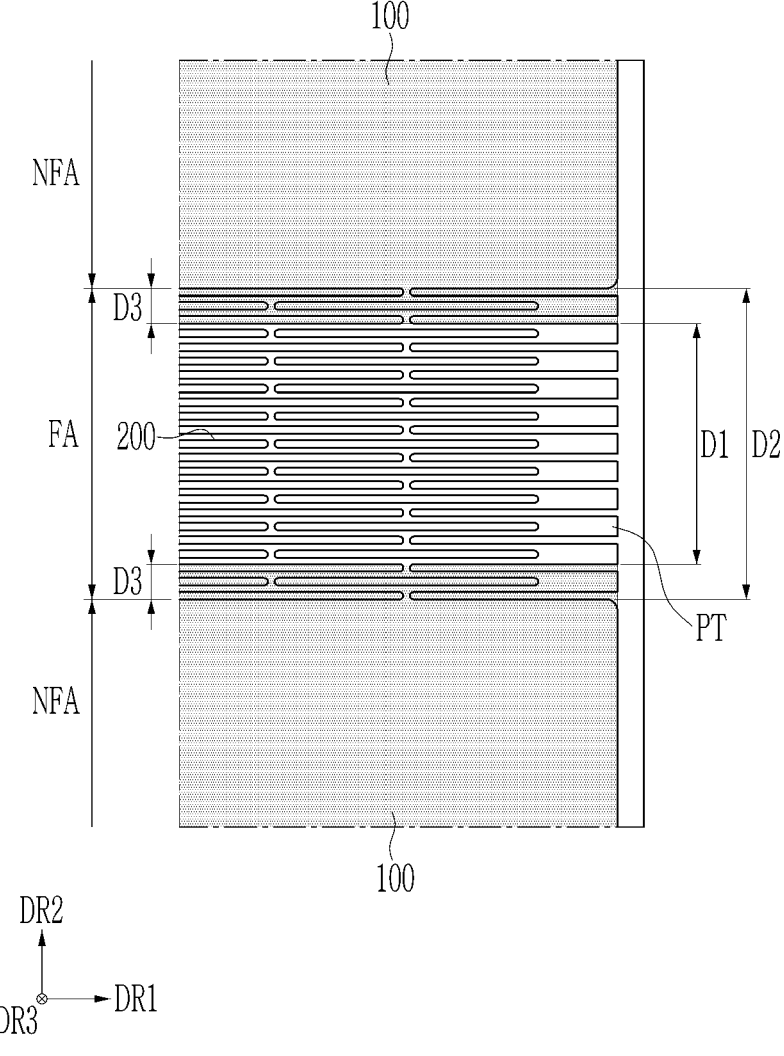
FIG. 6 illustrates an area corresponding to the area of FIG. 5 with respect to FIG. 1 according to some embodiments.

FIG. 6 illustrates an area corresponding to the area of FIG. 5 with respect to the embodiments described with respect to FIG. 1. That is, FIG. 6 illustrates a positional relationship of the adhesive layer 100 and the plate PT, and the groove 200 with respect to the embodiments described with respect to FIG. 1. Referring to FIG. 6, in the display device according to some embodiments, the separation distance D1 of the adhesive layer 100 in the second direction DR2 is shorter than the length D2 of an area in which the groove 200 is formed in the second direction DR2. Accordingly, a portion of the groove 200 of the plate PT overlaps the adhesive layer 100.

Particularly, as shown in FIG. 6, a portion in which the groove 200 starts to be formed is covered by the adhesive layer 100.

In this case, a sum (D3+D3) of lengths D3 of an area in which the adhesive layer 100 and the groove 200 overlap may be 30% to 60% of the length D2 of an area in which the groove 200 is formed. Although it will be described separately later, when the total length (D3+D3) of the overlapping area is less than 30%, lifting of the adhesive layer 100 may not be effectively prevented or reduced, and when the length (D3+D3) is greater than or equal to 60%, the adhesive layer 100 may aggregate, or may penetrate into the groove 200 during folding.

Figure 7:
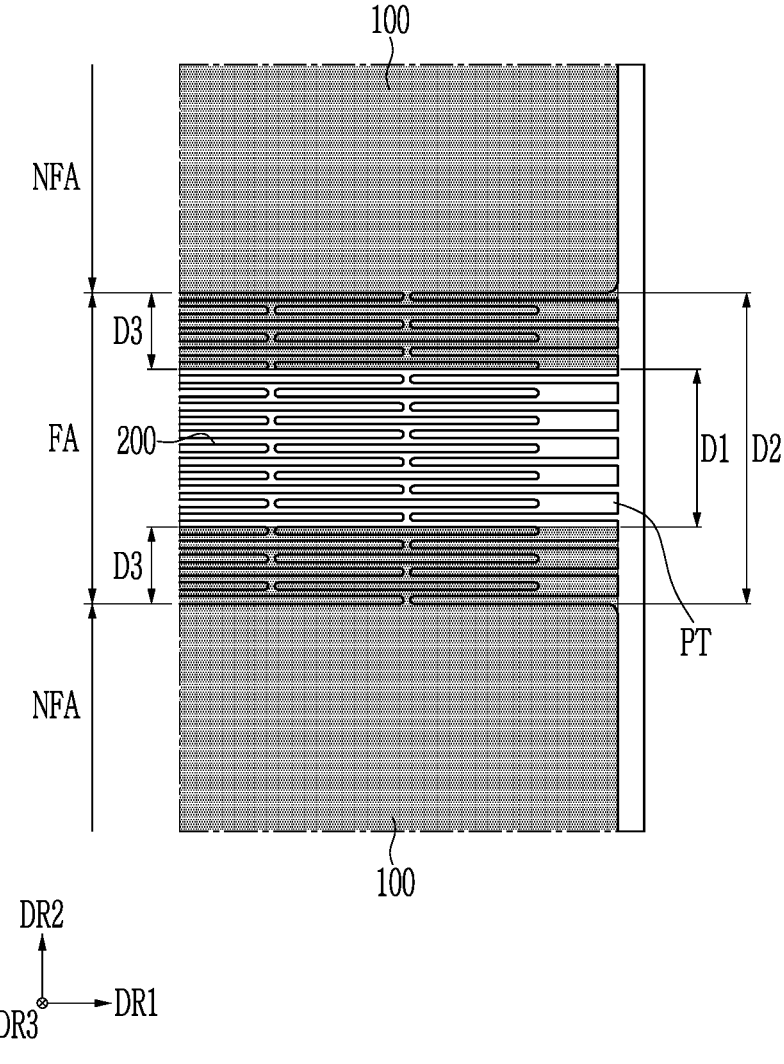
FIG. 7 illustrates the area of FIG. 6 according to some embodiments.

FIG. 7 illustrates further details of an example of the cross-section of FIG. 6. Referring to FIG. 7, in the display device according to some embodiments, a length D3 of the area in which the adhesive layer 100 and the groove 200 overlap is longer than that in FIG. 6. Even in this case, as shown in FIG. 6, deformation and lifting of the adhesive layer 100 may be reduced during folding. Even in the embodiments shown with respect to FIG. 7, a sum (D3+D3) of overlapping lengths of the adhesive layer 100 and the groove 200 may be 30% to 60% of the length D2 of the area in which the groove 200 is formed.

Figure 8:
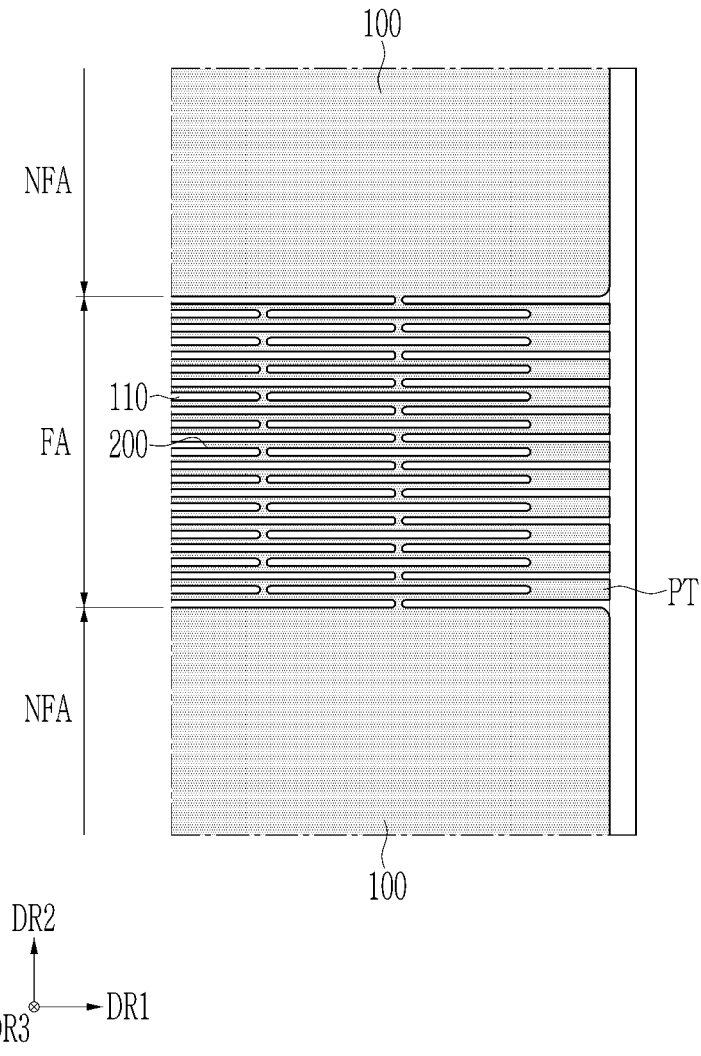
FIG. 8 illustrates an area corresponding to the area of FIG. 6 with respect to the embodiments of FIG. 2 according to some embodiments.

FIG. 8 illustrates an area corresponding to the area of FIG. 6 with respect to the embodiments shown in FIG. 2. That is, FIG. 8 illustrates a positional relationship of the adhesive layer 100 and the plate PT, and the groove 200 with respect to the embodiments shown with respect to FIG. 2. Referring to FIG. 8, in the display device according to some embodiments, the adhesive layer 100 is positioned in the entire area in which the groove 200 is formed. That is, the adhesive layers 100 may not be spaced apart from each other to be entirely positioned in the folding area FA. However, as shown in FIG. 8, the adhesive layer 100 includes an opening 110 corresponding to the groove 200. That is, the adhesive layers 100 are not spaced apart from each other in the folding area FA, and instead, include a plurality of openings 110.

Accordingly, it may be possible to reduce the deformation and lifting of the adhesive layer 100 during folding, and it may be possible to solve the problem that the adhesive layer 100 aggregates or penetrates into the groove 200 during folding. That is, when the adhesive layer 100 is positioned in the entire folding area FA, although the adhesive layer 100 may aggregate or penetrate into the groove 200 during folding, in the embodiments shown with respect to FIG. 8, because the adhesive layer 100 includes the opening 110 positioned in a portion corresponding to the groove 200 including the opening 110, the adhesive layer 100 does not agglomerate or penetrate into the groove 200 during folding. In addition, because the adhesive layer 100 is formed in the entire folding peripheral area NFA and folding area FA, it may be possible to solve the problem that the adhesive layer 100 is deformed or lifted during folding.

FIG. 8 illustrates the embodiments in which the opening 110 of the adhesive layer 100 coincides with the groove 200 of the plate PT, but the opening 110 of the adhesive layer 100 does not completely overlap the groove 200 of the plate PT, but may partially overlap it. That is, a portion of the opening 110 of the adhesive layer 100 may not overlap the groove 200 of the plate PT, and even in this case, it may be possible to solve the problem of the adhesive layer 100 being deformed or lifted during folding.

Figure 9:
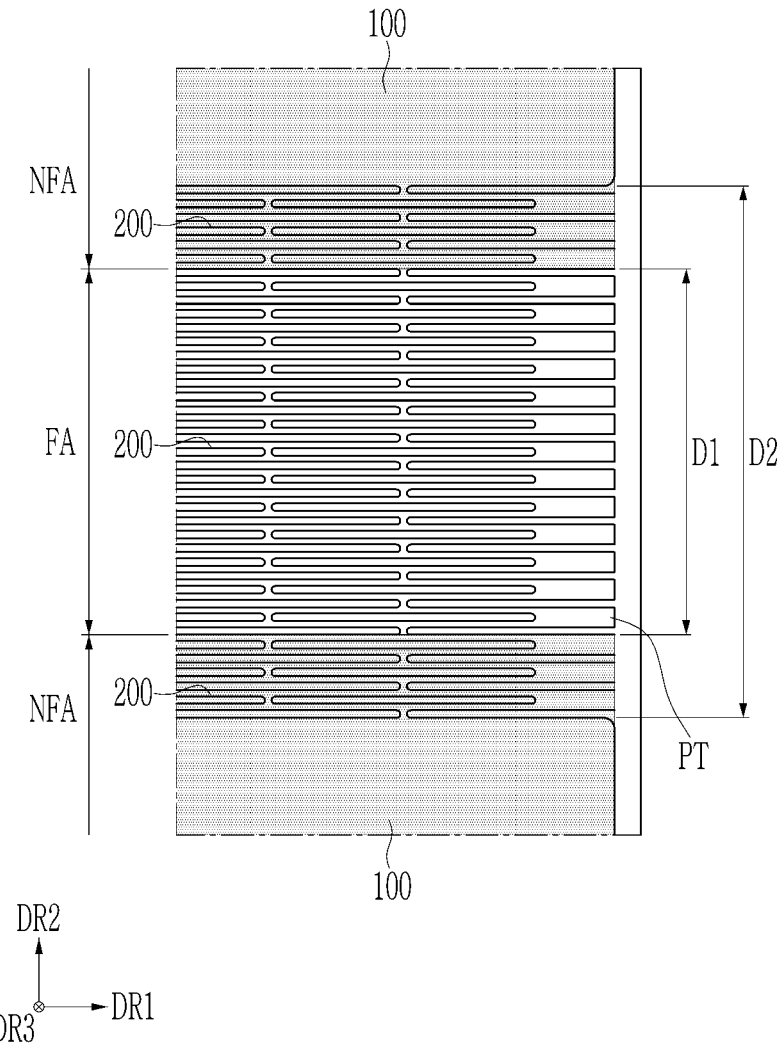
FIG. 9 illustrates the area of FIG. 6 according to some embodiments.

FIG. 9 illustrates aspects of the area of FIG. 6. Referring to FIG. 9, in the display device according to some embodiments, the groove 200 is formed in the folding peripheral area NFA. That is, in the embodiments shown with respect to FIG. 9, the groove 200 of the plate PT is extended to the folding peripheral area NFA instead of the adhesive layer 100 being extended to the folding area FA. Accordingly, even in the embodiments shown with respect to FIG. 9, the separation distance D1 of the adhesive layer 100 is shorter than the length D2 of the area in which the groove 200 is formed, as in FIG. 6. Accordingly, a portion of the groove 200 of the plate PT overlaps the adhesive layer 100. Accordingly, it may be possible to solve the problem of the adhesive layer 100 being deformed or lifted during folding. In the embodiments shown with respect to FIG. 9, the groove 200 is formed up to the folding peripheral area NFA, and the adhesive layers 100 are spaced apart from each other in the folding area FA. Accordingly, it may be possible to prevent or reduce instances of the adhesive layer 100 aggregating or penetrating into the groove 200 during folding.

Figure 10:
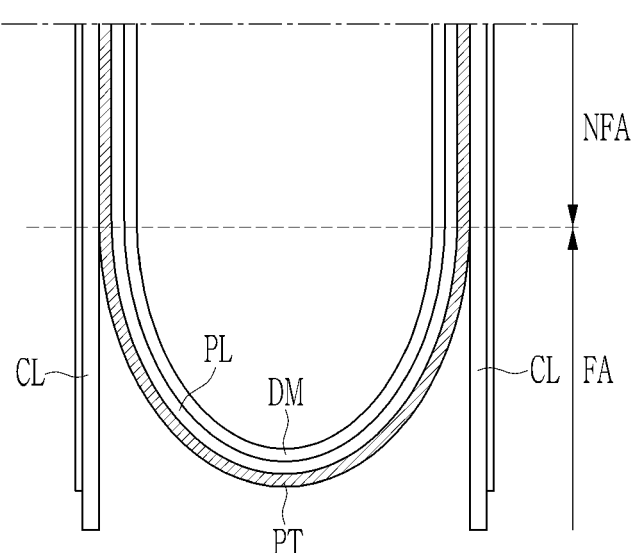
FIG. 10 illustrates a state in which a display device according to some embodiments is folded.

FIG. 10 illustrates a state in which a display device according to some embodiments is folded. FIG. 10 illustrates the display module DM, the protective member PL, and the plate PT. Referring to FIG. 10, a cover member CL is attached to the plate PT. FIG. 10 illustrates the folding area FA and the folding peripheral area NFA. During the folding as described above, when the adhesive layers 100 are spaced apart from each other in the folding area FA as shown in FIG. 4, a phenomenon in which the adhesive layer 100 is lifted at an edge thereof may occur.

Figure 11:
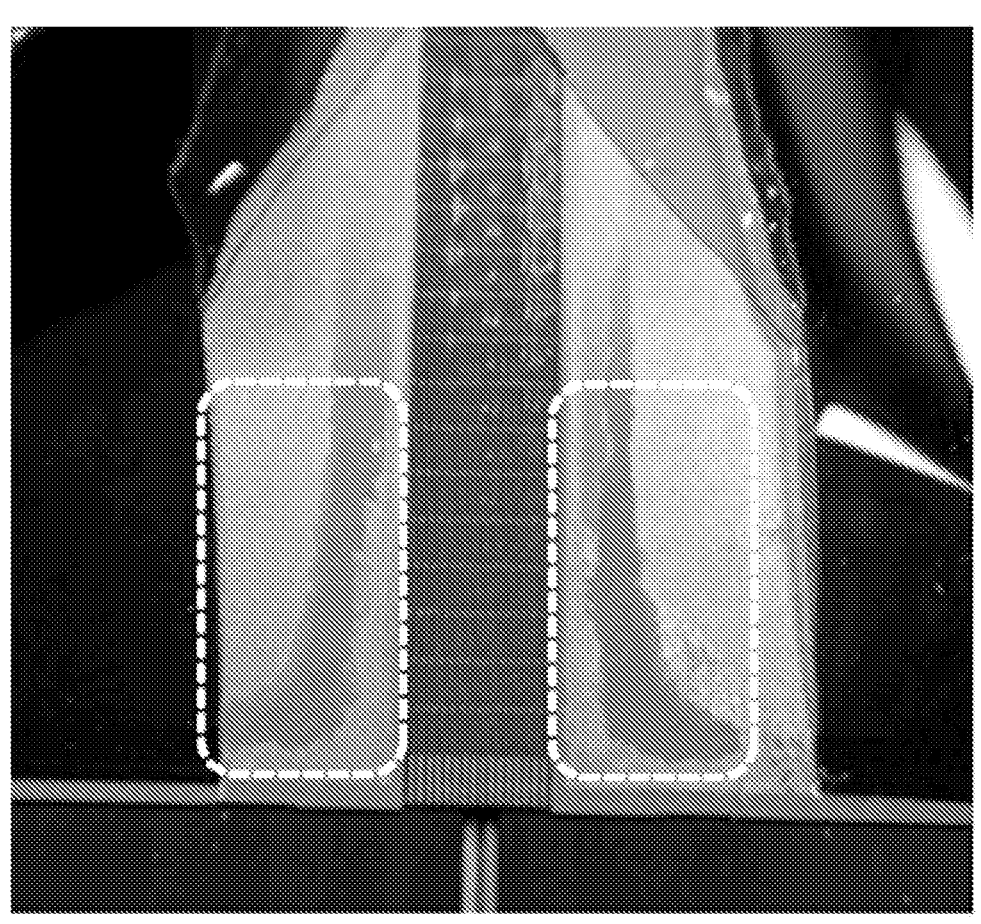
FIG. 11 illustrates an image in which an adhesive layer is lifted during folding according to some embodiments.

FIG. 11 illustrates an image in which the adhesive layer is lifted during the folding as described above. The portion in which the adhesive layer 100 is lifted is marked with a square box. The edge of the adhesive layer 100 may be peeled off at an interface thereof due to stress during folding and unfolding.

Figure 12:
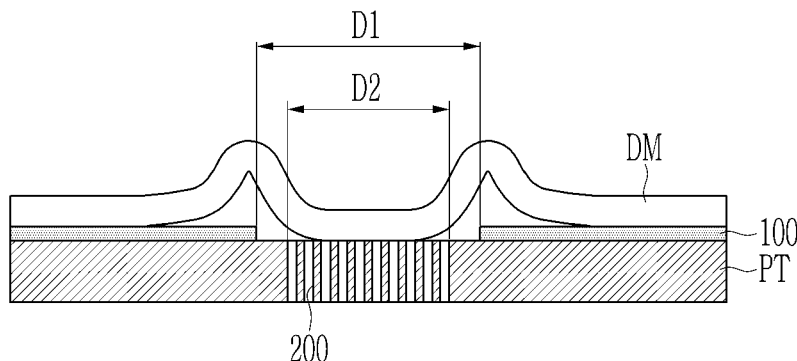
FIG. 12 illustrates a cross-section in which a lifting defect of a display module during folding and unfolding occurs when a separation distance of an adhesive layer is longer than a formation length of a groove as shown in FIG. 4 according to some embodiments.

FIG. 12 illustrates a cross-section of a lifting defect of the display module DM during folding and unfolding when the separation distance D1 of the adhesive layer 100 is longer than the formation length D2 of the groove as shown in FIG. 4. Referring to FIG. 12, a lifting defect of the display module DM occurs at a boundary portion in which the adhesive layer 100 is attached. This is because the display module DM and the plate PT may not be stably bonded in an area in which the adhesive layer 100 is not positioned. However, in the display device according to some embodiments, the adhesive layer 100 is positioned to partially overlap the groove 200 of the plate PT, so that the plate PT and the display module DM may be stably bonded.

Figure 13:
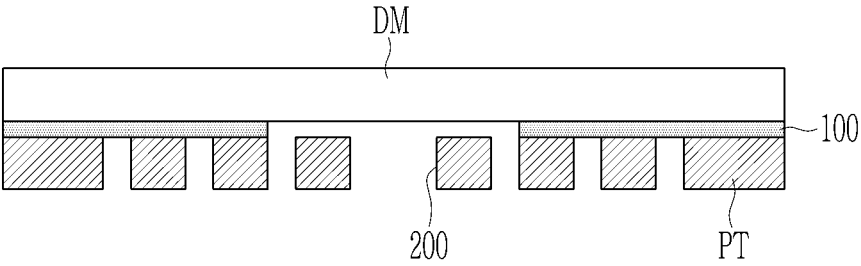
FIG. 13 illustrates a schematic cross-section of a display device according to some embodiments.

FIG. 13 illustrates a schematic cross-section of a display device according to some embodiments. Referring to FIG. 13, in the display device according to some embodiments, the groove 200 of the plate PT and the adhesive layer 100 partially overlap. Accordingly, it may be possible to relatively stably bond the plate PTO and the display module DM, and it may be possible to prevent or reduce instances of the display module DM lifting even when the display device is folded.

Figure 14:
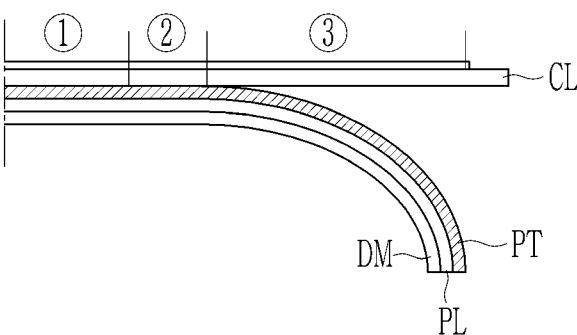
FIG. 14 illustrates an effect according to respective formation positions while varying formation positions of an adhesive layer as 1, 2, and 3 according to some embodiments.

FIG. 14 illustrates an effect according to respective formation positions while varying formation positions of an adhesive layer as 1, 2, and 3. These results are described in Table 1 below.

TABLE 1

| [ ₥ ] | | | |
| --- | --- | --- | --- |
| | Example 1 | Example 2 | Example 3 |
| Formation position of adhesive layer in FIG. 14 | 1 | 2 | 3 |
| Low temperature modulus effect (G') | Small | Small | Large |
| Additional process | Unnecessary | Unnecessary | Non-adhesive treatment |
| Improvement effect | X (bad) | Good (2$^{nd}$) | Excellent (1$^{st}$) |

Figure 15:
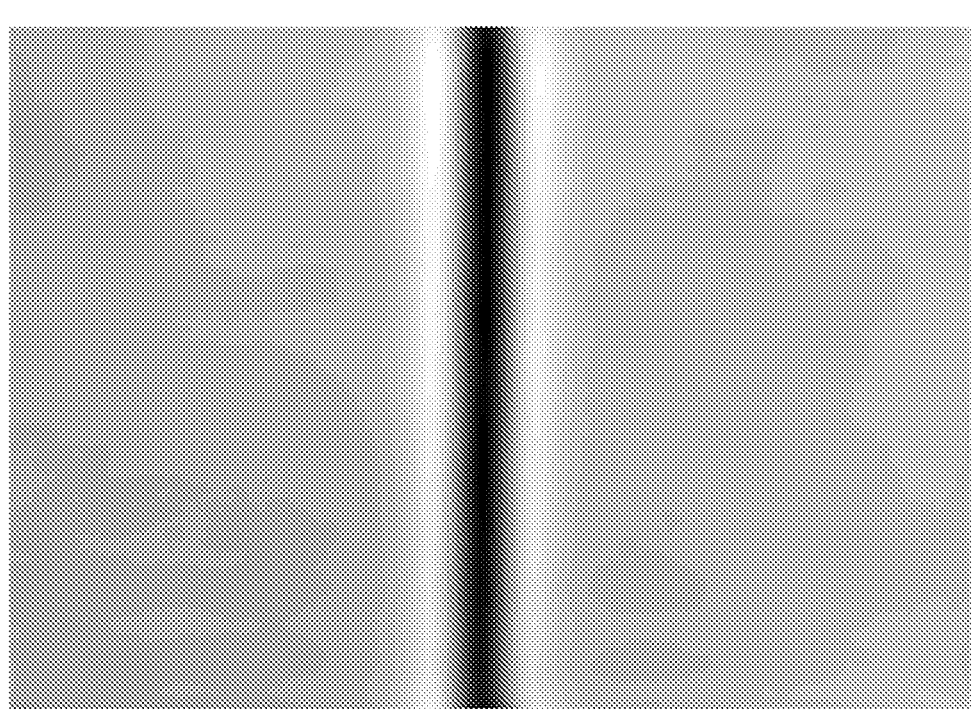
FIG. 15 illustrates an image of a crease measured during folding in a folding portion of a display device having a curvature of 1.5 R.
Figure 16:
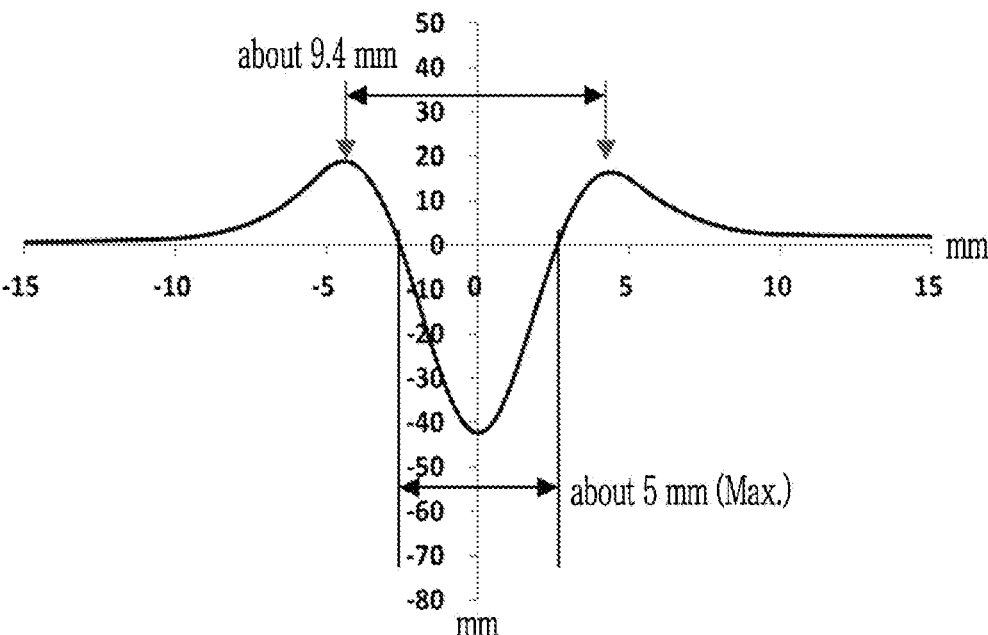
FIG. 16 illustrates a graph corresponding to the crease of FIG. 15 according to some embodiments.

As can be seen in the Table 1, in a case of the examples in which the adhesive layer does not overlap the folding area FA, there was the problem that the adhesive layer was lifted or deformed. In Example 3 in which the adhesive layer overlaps the entire folding area FA, the problem of lifting or deformation of the adhesive layer was the least. However, in the case of Example 3, a non-adhesive treatment process is required. Accordingly, it can be confirmed that Example 2 in which the adhesive layer partially overlaps the folding area FA may be desirable. FIG. 15 illustrates an image of a crease measured during folding in the folding area of the display device having a curvature of 1.5 R, and FIG. 16 illustrates a graph corresponding to the crease of FIG. 15. Referring to FIG. 15 and FIG. 16, when the curvature is 1.5 R, a crease having a width of about 9.4 mm is formed, and in this case, a portion overlapping the adhesive layer is preferably 60% of the crease width at most.

Figure 17:
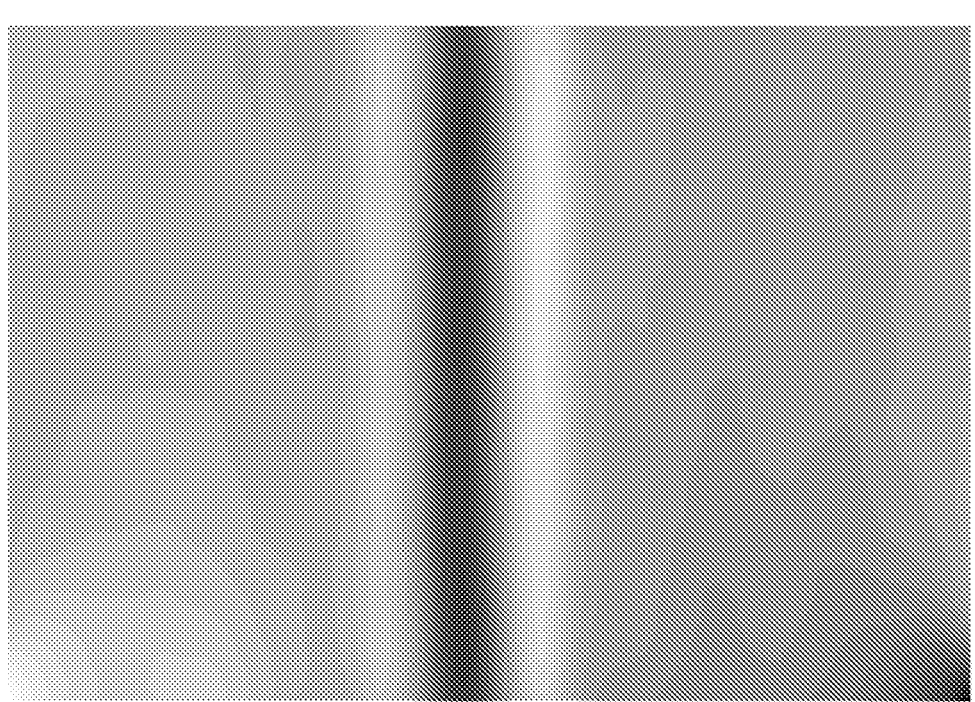
FIG. 17 illustrates an image of a crease measured during folding in a folding portion of a display device having a curvature of 2.5 R.
Figure 18:
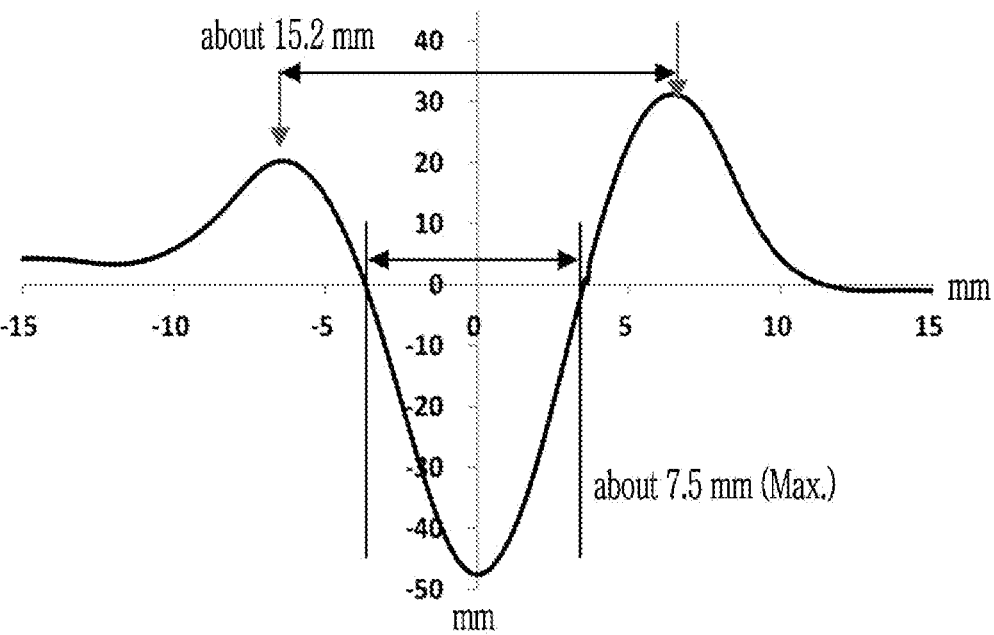
FIG. 18 illustrates a graph corresponding to the crease of FIG. 17 according to some embodiments.

Similarly, FIG. 17 illustrates an image of a crease measured during folding in a folding area of the display device having a curvature of 2.5 R, and FIG. 18 illustrates a graph corresponding to the crease of FIG. 17. Referring to FIG. 17 and FIG. 18, when the curvature is 2.5 R, a crease having a width of about 15.2 mm is formed, and in this case, a portion overlapping the adhesive layer is preferably 60% of the crease width at most.

Figure 19:
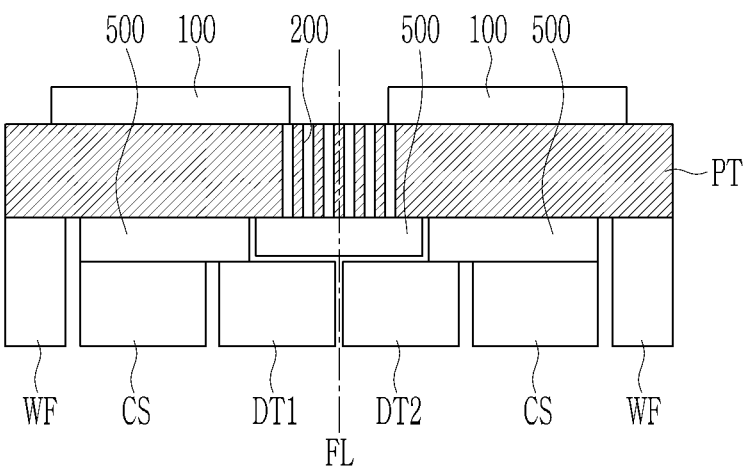
FIG. 19 illustrates a stacked structure under a plate in a display device according to some embodiments.

FIG. 19 illustrates a stacked structure under the plate PT in the display device according to some embodiments. Referring to FIG. 19, the display device according to some embodiments includes the adhesive layer 100 overlapping the folding area FA of the plate PT. A portion of the adhesive layer 100 overlaps the groove 200 of the plate PT.

In FIG. 19, a digitizer DT may be positioned under the plate PT. The digitizer DT may detect intensity, direction, and the like of a signal inputted from an electronic pen or the like.

According to some embodiments, the digitizer DT may include a first digitizer DT1 positioned at a left side with respect to (or based on) a folding axis FL and a second digitizer DT2 positioned at a right side of the folding axis FL.

The digitizer DT may be made of a metal. A cushion layer CS may be positioned on a side surface of the digitizer DT. The cushion layer CS may serve to prevent, reduce, or minimize damage to a structure arranged on the cushion layer CS due to an impact from the outside. According to some embodiments, the cushion layer CS may include a pressure sensitive adhesive.

A waterproof member WF may be arranged at the outside of the cushion layer CS. The waterproof member WF may prevent, reduce, or minimize damage to constituent elements of the display device by blocking or absorbing moisture being introduced from the outside of the display device. In this case, the waterproof member WF may be provided as a tape, a sponge, or the like. The cushion layer CS and the digitizer DT may be attached to the plate PT with an adhesive layer 500.

Figure 20:
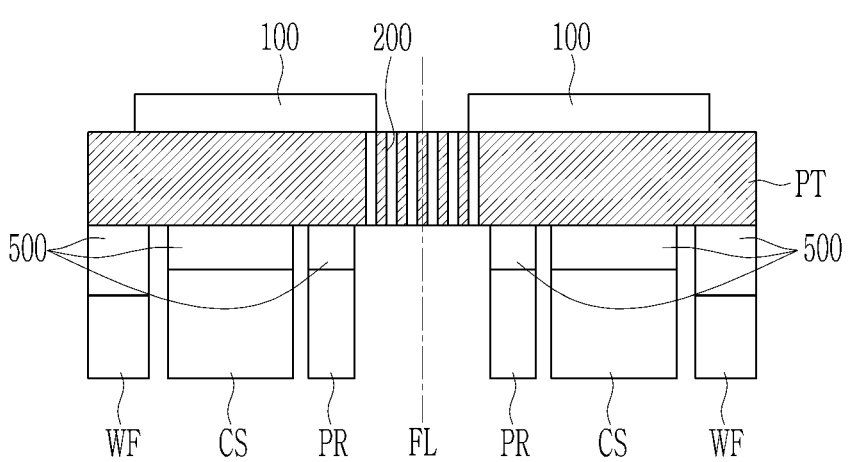
FIG. 20 illustrates a cross-section of the structure of FIG. 19 according to some embodiments.

FIG. 20 illustrates a cross-section of the structure illustrated in FIG. 19. The embodiments of FIG. 20 are the same as that of FIG. 19 except that the digitizer DT is omitted and the protective layer PR is positioned. Detailed description of the same constituent elements will be omitted. In FIG. 20, a structure having rigidity such as a metal may not be positioned under the folding area FA. Therefore, a folding operation may be further easily performed.

While aspects of some embodiments according to the present disclosure have been described in connection with what is presently considered to be practical embodiments, it is to be understood that the invention is not limited to the disclosed embodiments, but, on the contrary, is intended to cover various modifications and equivalent arrangements included within the spirit and scope of the appended claims, and their equivalents.

DESCRIPTION OF SOME OF THE REFERENCE SYMBOLS

PT: plate
100: adhesive layer
FA: folding area
200: groove
DM: display module
NFA: folding peripheral area

What is claimed is:

1. A display device comprising:
a display module;
a plate on one surface of the display module; and
an adhesive layer between the display module and the plate,
wherein the plate includes a folding area and a folding peripheral area,
the folding area of the plate includes a plurality of grooves, and
the adhesive layer extends continuously across at least a first one of the plurality of grooves between the display module and the plate to overlap a first portion of the folding area and does not overlap at least a second one of the plurality of grooves at a second portion of the folding area in a plan view,
the plurality of grooves are positioned along a first direction,
the display device is folded in a second direction perpendicular to the first direction, and
a ratio of a length in the second direction of the folding area overlapping the adhesive layer to a length in the second direction of the folding area is in a range of 30% to 60%.

2. The display device of claim 1, wherein
the adhesive layer includes areas spaced apart from each other in the second direction, and
the areas spaced apart from each other overlap the folding area.

3. The display device of claim 2, wherein
a length in the second direction of the adhesive layer including the areas spaced apart from each other is shorter than a length in the second direction of an area where a groove is formed.

4. The display device of claim 1, wherein
the plate further includes a groove in a non-folding area.

5. The display device of claim 1, further comprising
a protective member between the display module and the adhesive layer.

6. The display device of claim 1, wherein the plurality of grooves are spaced apart from each other in the first direction and the second direction.

7. The display device of claim 1, further comprising
a digitizer on an other surface of the plate.

8. A display device comprising:
a display module;
a plate on one surface of the display module; and
an adhesive layer between the display module and the plate,
wherein the plate includes a folding area and a folding peripheral area,
the folding area of the plate includes a plurality of grooves,
the adhesive layer extends continuously across at least a first one of the plurality of grooves between the display module and the plate to overlap a first portion of the plurality of grooves in the folding area and does not overlap at least a second one of the plurality of grooves at a second portion of the plurality of grooves in the folding area in a plan view, and
the adhesive layer includes a plurality of grooves overlapping the folding area,
the plurality of grooves are positioned along a first direction,
the display device is folded in a second direction perpendicular to the first direction, and
a ratio of a length in the second direction of the folding area overlapping the adhesive layer to a length in the second direction of the folding area is in a range of 30% to 60%.

9. The display device of claim 8, wherein
a groove of the adhesive layer overlaps a groove of the plate.

10. The display device of claim 8, wherein
a groove of the adhesive layer includes an area that does not overlap a groove of the plate.

11. The display device of claim 8, wherein the plurality of grooves of the adhesive layer are positioned along the first direction, and the display device is folded in a second direction perpendicular to the first direction.

12. The display device of claim 8, wherein the plurality of grooves of the plate are spaced apart from each other in the first direction and the second direction.

13. The display device of claim 8, wherein the plurality of grooves of the adhesive layer are spaced apart from each other in the first direction and the second direction.

14. The display device of claim 8, further comprising
a protective member between the display module and the adhesive layer.

15. The display device of claim 8, further comprising
a digitizer on an other surface of the plate.

16. The display device of claim 8, wherein
the plate further includes a groove in a non-folding area.

* * * * *